United States Patent
Nagai et al.

(10) Patent No.: US 9,467,797 B2
(45) Date of Patent: Oct. 11, 2016

(54) SYSTEM FOR REMOTE CONTROL BY VEHICLE-MOUNTED DEVICE

(75) Inventors: Yasushi Nagai, Tokyo (JP); Atsushi Shimizu, Tokyo (JP)

(73) Assignee: CLARION CO., LTD., Saitama (JP)

( * ) Notice: Subject to any disclaimer, the term of this patent is extended or adjusted under 35 U.S.C. 154(b) by 194 days.

(21) Appl. No.: 14/232,914

(22) PCT Filed: Jun. 21, 2012

(86) PCT No.: PCT/JP2012/065871
§ 371 (c)(1),
(2), (4) Date: Jan. 15, 2014

(87) PCT Pub. No.: WO2013/015054
PCT Pub. Date: Jan. 31, 2013

(65) Prior Publication Data
US 2014/0162623 A1    Jun. 12, 2014

(30) Foreign Application Priority Data

Jul. 22, 2011  (JP) .................................. 2011-160434

(51) Int. Cl.
*H04Q 7/10* (2006.01)
*H04W 4/00* (2009.01)
(Continued)

(52) U.S. Cl.
CPC .......... *H04W 4/003* (2013.01); *G01C 21/3661* (2013.01); *G08G 1/168* (2013.01);
(Continued)

(58) Field of Classification Search
CPC .................... G06Q 10/0639; G06Q 10/0833; G01C 21/36; G08G 1/096827; H04W 4/003
USPC .............. 455/419, 420; 340/5, 61, 461, 990
See application file for complete search history.

(56) References Cited

U.S. PATENT DOCUMENTS 5,299,132 A    3/1994 Wortham

2005/0266879 A1*  12/2005  Spaur .................. H04L 12/4625
455/556.2
(Continued)

FOREIGN PATENT DOCUMENTS

CN          1783161 A       6/2006
JP          2004-15787      1/2004
(Continued)

OTHER PUBLICATIONS

"NAVTEQ, Nokia, and Magneti Marelli Integrate Smartphone Into Car Entertainment System", Internet Citation, Sep. 17, 2009, pp. 1-3, XP002619183, Retrieved from the Internet: URL:http://www.gadgetpaper.com/navteq-nokia-and-magneti-marelli-integrate-smartphone-into-car-entertainment-system/ [retrieved on Jan. 28, 2011].
(Continued)

*Primary Examiner* — Patrick Edouard
*Assistant Examiner* — Julio Perez
(74) *Attorney, Agent, or Firm* — Baker Botts L.L.P.

(57) ABSTRACT

In this system is provided with a mobile telephone, a server and a vehicle-mounted device with different input/output methods, when an application unit of the mobile telephone is started, control programs and settings suitable for the combination of the vehicle-mounted device, the mobile telephone and the application unit are acquired from the server for an input switching unit, output switching unit, vehicle-internal communication control unit, input control unit and display control unit of the vehicle-mounted device and for an input switching unit, output switching unit, vehicle-internal communication control unit, input control unit, display control unit, input conversion unit and output conversion unit of the mobile telephone, and, after setup and installation, mobile telephone application programs can be remotely controlled by the vehicle-mounted device by running this application unit.

5 Claims, 6 Drawing Sheets

(51) Int. Cl.
  *H04M 1/725*  (2006.01)
  *G01C 21/36*  (2006.01)
  *G08G 1/16*   (2006.01)
  *H04L 29/08*  (2006.01)
  *H04W 4/04*   (2009.01)
  *H04L 12/24*  (2006.01)

(52) U.S. Cl.
  CPC .......... *H04L 41/082* (2013.01); *H04L 67/125* (2013.01); *H04L 67/34* (2013.01); *H04M 1/7253* (2013.01); *H04M 1/72525* (2013.01); *H04W 4/001* (2013.01); *H04W 4/046* (2013.01); *H04L 67/12* (2013.01); *H04L 67/2823* (2013.01); *H04M 1/72533* (2013.01)

(56)     References Cited

U.S. PATENT DOCUMENTS

| | | |
|---|---|---|
| 2006/0293813 A1 | 12/2006 | Nou |
| 2008/0140265 A1 | 6/2008 | Hong et al. |
| 2009/0177677 A1* | 7/2009 | Mikusiak ............... G01C 21/32 |
| 2010/0138149 A1* | 6/2010 | Ohta ...................... G01C 21/26 701/533 |
| 2010/0217657 A1 | 8/2010 | Gazdzinski |
| 2010/0262673 A1* | 10/2010 | Chang ................... G06F 3/1454 709/217 |
| 2011/0301839 A1* | 12/2011 | Pudar ................... H04W 4/046 701/408 |
| 2011/0307188 A1* | 12/2011 | Peng .................. G06Q 10/0639 702/33 |

FOREIGN PATENT DOCUMENTS

| | | |
|---|---|---|
| JP | 2007-133601 | 5/2007 |
| JP | 2008-3826 | 1/2008 |
| JP | 2010-44458 | 2/2010 |
| JP | 2010-130669 | 6/2010 |
| JP | 2010-272930 A | 12/2010 |
| KR | 2008-0052997 A | 6/2008 |

OTHER PUBLICATIONS

Extended European Search Report, mailed Apr. 13, 2015, which issued during the prosecution of European Application No. 12817440.6, which corresponds to the present application.

* cited by examiner

FIG. 3

| VEHICLE-MOUNTED DEVICE ID (301) | MOBILE TELEPHONE ID (302) | APPLICATION ID (303) | VERSION (304) | INPUT-OUTPUT SWITCHING SETTING ID (305) | INPUT CONVERSION FILE ID (306) | OUTPUT CONVERSION PROGRAM ID (307) | VEHICLE-MOUNTED DEVICE VEHICLE-INTERNAL COMMUNICATION PROGRAM ID (308) | MOBILE TELEPHONE VEHICLE-INTERNAL COMMUNICATION PROGRAM ID (309) |
|---|---|---|---|---|---|---|---|---|
| 123 | 233 | 1 | 1 | 1 | 1 | 1 | 1 | 1 (310) |
| 123 | 233 | 2 | 2 | 2 | 1 | 1 | 1 | ... (311) |
| ... | ... | ... | ... | ... | ... | ... | ... | ... |

FIG. 4

| INPUT CODE | CONTROL CODE | ICON |
|---|---|---|
| KEY (1) | STOP | " STOP " |
| KEY (2) | START | "_→" |
| DIAL (1) UP | ENLARGEMENT | "<_>" |
| DIAL (1) DOWN | CONTRACTION | "_><_" |
| SENSOR CODE (1) | MOBILE TELEPHONE GPS CODE (1) | NOTHING |
| SENSOR CODE (2) | MOBILE TELEPHONE GPS CODE (2) | NOTHING |
| MAP DATA CODE (1) | MOBILE TELEPHONE MAP DATA CODE (1) | NOTHING |
| MAP DATA CODE (2) | MOBILE TELEPHONE MAP DATA CODE (2) | NOTHING |

SYSTEM FOR REMOTE CONTROL BY VEHICLE-MOUNTED DEVICE

INCORPORATION BY REFERENCE

The present application claims priority from Japanese application JP 2011-160434 filed on Jul. 22, 2011, the content of which is hereby incorporated by reference into this application.

TECHNICAL FIELD

The subject matter disclosed herein relates to a method for updating a new program by a vehicle-mounted device and a program for realizing a remote control by the vehicle-mounted device of an apparatus.

BACKGROUND ART

On a vehicle, the vehicle-mounted device (hereinafter, referred to as a car navigation) that gives a map or information attached to the map to a user, or that renders a service such as directions is generally used. Further, recently, high functioning of a mobile telephone such as a smart-phone is advanced, and the same service as that of the vehicle-mounted device can be provided.

The vehicle-mounted device is integrated with the vehicle, and even if update frequency of information and programs is low and the device is old, it is used as is and used for 7 or 10 years in many cases. Programs of the vehicle-mounted device can be frequently updated at an outlet store, but the vehicle-mounted device needs to be brought thereinto and a lot of trouble is taken.

As compared to the above, the mobile telephone with a high function is newly bought in about two years in many times and an old device is rarely used. Further, the mobile telephone having a high function is always connected to a network. The update frequency of information and programs by a server is high, and fresh information and a new function can be always used.

However, the mobile telephone is intended to be brought with the user, and therefore a window and an operation button are small. The mobile telephone is not suitable to be used on the vehicle, particularly, while driving.

In view of the foregoing, there is used an idea that a service of the mobile telephone is controlled from the vehicle-mounted device provided with windows and buttons suitable for the vehicle. As a conventional technology about this idea, there have been Patent Literatures 1, 2, and 3.

In Patent Literature 1, "a remote control system for remotely controlling a computer terminal" is described (refer to an abstract). When a remote control target terminal is used as the mobile telephone and a control instruction terminal is used as the vehicle-mounted device, a display of an application such as the mobile telephone is displayed on the vehicle-mounted device, and the mobile telephone or programs thereof can be used from the vehicle-mounted device. When such a mechanism is used, a display of various types of devices to be watched in the vehicle can also be unified into the vehicle-mounted device.

In Patent Literature 2, "a remote control system that enables one remote control device to control a plurality of apparatus" is described (refer to an abstract). When this technology is used, a remote control can be made by an input of the device in which an output method and an input method are different from each other. That is, windows of the mobile telephone are converted and displayed in accordance with a vehicle-mounted device display. The user can use an application of the mobile telephone by an input of buttons, dials, and a touch panel of the vehicle-mounted device of the vehicle-mounted device.

In Patent Literature 3, "a software package, a system management device, and an onboard information apparatus that improve efficiency in updating of software, in a system having a plurality of processing units" is described (refer to an abstract). By using this technology, software of various types of devices connected to a network can be updated. That is, a window reception method of the vehicle-mounted device from the frequently-updated mobile telephone can be added and changed. Therefore, the window reception method of the vehicle-mounted device can be changed in each mobile telephone having a different window transfer method.

CITATION LIST

Patent Literature

PATENT LITERATURE 1: JP-A-2010-44458
PATENT LITERATURE 2: JP-A-2004-15787
PATENT LITERATURE 3: JP-A-2007-133601

SUMMARY OF INVENTION

Technical Problem

When an idea that services of the mobile telephone are controlled from the vehicle-mounted device is realized in a combination of technologies of Patent Literatures 1, 2, and 3, the following problems arise.

By using the technology of Patent Literature 2, first, a window of a device having a different window transfer method cannot be displayed. That is, there arises a problem that a window reception method of the vehicle-mounted device cannot be changed in each mobile telephone and cannot be dealt with. Further, an input method peculiar to the apparatus can be dealt with, but there arises a problem that a key input method peculiar to each application cannot be dealt with.

Since connected devices are centrally managed, a management table becomes large. This table needs a large memory also in the mobile telephone or in the vehicle-mounted device.

To deal with a new apparatus, the presence or absence of update of the management table is confirmed by a PC and updated. Therefore, a lot of trouble with confirmation of the update is taken, and it is difficult to deal with the mobile telephone in which a new type is continuously sold, and the continually-updated application. Further, the update confirmation is left to the user, and when the confirmation is not performed, the update cannot be dealt with. In addition, when the vehicle-mounted device with no network IF is detached from the vehicle and connected to a PC, a large burden is imposed on the user.

In the technology of Patent Literature 3, it is difficult to perform a central management including the functions of the mobile telephone also by the vehicle-mounted device. Since the same mobile telephone is not always connected to the vehicle-mounted device, the mobile telephone to be updated by the vehicle-mounted device is hard to centrally manage. Further, there arises a problem that since an application is added to a mobile telephone single body, the application of the mobile telephone also cannot be centrally managed by the vehicle-mounted device. Further, since the mobile telephone also is not always connected to the same vehicle-mounted device, the versions of the vehicle-mounted device are hard to centrally manage also in the mobile telephone.

There arises a problem that in this manner, since a mechanism of keeping a match of the vehicle-mounted device, the mobile telephone, the vehicle-mounted device software, and the mobile telephone software is not used, even if a mismatch due to a version difference is present, it cannot be checked.

Solution to Problem

There is disclosed a remote control system that, by the vehicle-mounted device, solves the above-described problems, combines the various vehicle-mounted devices and mobile telephones having different input and output methods, and uses an input-output device of the vehicle-mounted device so as to use the application of the mobile telephone.

The mobile telephone of the present specification is an information processing device including a communication IF for communicating with the vehicle-mounted device and the server. The mobile telephone includes, of course, one generally called a mobile telephone and additionally, for example, a personal computer and a game machine that communicate with the vehicle-mounted device and the server through a wireless LAN IF, and a personal computer and a game machine that communicate with the vehicle-mounted device through a USB IF and that communicate with the server through a radio channel IF, and is also referred to as the mobile terminal in the present specification.

In the present specification, according to one disclosed specific aspect, in a remote control system that includes a vehicle-mounted device, a mobile terminal, and a server, and remotely operates by the vehicle-mounted device an application unit that operates on the mobile terminal, the vehicle-mounted device includes an input switching unit that switches a transmission destination of information from an input control unit to the mobile terminal, an output switching unit that switches an output to a display control unit to an output from an application unit of the mobile terminal, and a vehicle-internal communication control unit for communicating with the mobile terminal, the mobile terminal includes a vehicle-internal communication control unit for communicating with the vehicle-mounted device, an input conversion unit that converts information transmitted from the vehicle-mounted device into a format according to a specification of the application unit, an output conversion unit that converts an output of an application into a format according to a specification of the vehicle-mounted device, an input switching unit that switches an input to the application unit of the mobile terminal to the input information converted by the input conversion unit, and an output switching unit that switches an output destination of an output of the application unit to the output conversion unit, the server includes a setting file and/or a program for each realizing one or more of an input switching unit, an output switching unit, a vehicle-internal communication control unit, an input conversion unit, and an output conversion unit, the mobile terminal receives the vehicle-mounted device identification data from the vehicle-mounted device connected via the vehicle-internal communication control unit, acquires identification data for specifying the vehicle-mounted device, the mobile terminal, and the application unit when the application is started up, transmits it to the server, acquires from the server a setting file and/or a program for realizing the input switching unit, the output switching unit, the vehicle-internal communication control unit, the input control unit, and the display control unit of the vehicle-mounted device, suitable for a combination of the specified vehicle-mounted device, mobile terminal, and application unit, transmits them to the vehicle-mounted device, acquires from the server a setting file and/or a program for realizing the input switching unit, the output switching unit, the vehicle-internal communication control unit, the input control unit, the display control unit, the input conversion unit, and the output conversion unit of the mobile terminal suitable for the combination, and sets and/or installs them, and the vehicle-mounted device sets and/or installs them on the basis of the transmitted setting file and/or program, and remotely controls the application of the mobile terminal by the input unit and the 1.5 output unit.

The input conversion unit of the mobile terminal may refer to an input conversion table received from the server, and convert the input information acquired by the vehicle-mounted device, and the input switching unit may select any of information that can be acquired by the mobile terminal inside and information that is acquired by the vehicle-mounted device and converted by the input conversion unit, and output it to the application unit.

Further, in a remote control system according to another aspect, the vehicle-mounted device includes the input switching unit that switches a transmission destination of information from the input control unit to the mobile terminal, the input conversion unit that converts information output from the input switching unit into a format according to a specification of the application unit of the mobile terminal, the output conversion unit that converts an output of the application unit acquired from the mobile terminal into a format according to a specification of the display control unit of the vehicle-mounted device, the output switching unit that outputs an output of the application unit output and converted from the output conversion unit to the display control unit, and the vehicle-internal communication control unit for communicating with the mobile terminal, the mobile terminal includes the vehicle-internal communication control unit for communicating with the vehicle-mounted device, the input switching unit that switches an input to the application unit to converted information transmitted from the vehicle-mounted device, and the output switching unit that switches an output destination of an output of the application unit to the vehicle-mounted device, the server includes a setting file and/or a program for each realizing one or more of the input switching unit, the output switching unit, the vehicle-internal communication control unit, the input conversion unit, and the output conversion unit, the mobile terminal receives the vehicle-mounted device identification data from the vehicle-mounted device that is connected via the vehicle-internal communication control unit, when the application is started up, acquires identification data for specifying the vehicle-mounted device, the mobile terminal, and the application unit, and transmits it to the server, acquires from the server a setting file and/or a program for realizing the input switching unit, the output switching unit, the vehicle-internal communication control unit, the input control unit, the display control unit, the input conversion unit, and the output conversion unit of the vehicle-mounted device, suitable for a combination of the specified vehicle-mounted device, mobile terminal, and application unit, and transmits them to the vehicle-mounted device, and acquires from the server a setting file and/or a program for realizing the input switching unit, the output switching unit, the vehicle-internal communication control unit, the input control unit, and the display control unit of the mobile terminal, suitable for the combination, and sets and/or installs them, and the vehicle-mounted device sets and/or installs them on the basis of the transmitted setting file and/or program, and remotely controls the application of the mobile terminal by the input unit and the output unit.

According to the aspect shown-above, in the combinations of the various vehicle-mounted devices and mobile terminals having different input and output methods, programs of the vehicle-mounted device and the mobile terminal for using the application of the mobile terminal can be updated by the input and output device of the vehicle-mounted device.

Thereby, the windows of the devices having the different window transfer methods can be displayed. That is, the window reception method of the vehicle-mounted device can be changed in each mobile terminal, and various mobile terminals can be remotely controlled. Further, not only the input method peculiar to the device of the mobile terminal but also the key input method peculiar to each application of the mobile terminal can be used. For effectively using a communication function of the mobile terminal, when the mobile terminal being a control target device and the vehicle-mounted device being a control instruction device are prepared, the user can easily use even the device of the new mobile terminal by the vehicle-mounted device. Further, an update confirmation is performed at the time when the user selects an application program desired to be remotely controlled. Therefore, the update confirmation about the remote control of a necessary program can be surely performed without imposing a burden to perform a special operation on the user.

Further, on the contrary, in the combinations of the various vehicle-mounted devices and mobile terminals having the different input and output methods, the programs of the vehicle-mounted device and the mobile terminal for using the application of the vehicle-mounted device can be updated by the input and output device of the mobile terminal.

In addition, in the combinations of the various vehicle-mounted devices and mobile terminals having the different input and output methods, information of higher accuracy from a GPS of the vehicle-mounted device can be used by the application of the mobile terminal.

Similarly, in the combinations of the various vehicle-mounted devices and mobile terminals having the different input and output methods, the latest information such as a map and POI of the mobile terminal can be used by the application of the vehicle-mounted device.

Since the connected devices are managed by the server, a large management table need not be provided on the vehicle-mounted device or the mobile terminal. Further, even if the mobile terminal connected to the vehicle-mounted device is changed, an appropriate update can be performed to a new combination of the vehicle-mounted device, the mobile terminal, and the application, and the match of the vehicle-mounted device, the mobile terminal, the vehicle-mounted device software, and the mobile terminal software can be kept.

Advantageous Effects of Invention

According to the present disclosure, in the combinations of the various vehicle-mounted devices and mobile terminals having the different input and output methods, the input and output device of the vehicle-mounted device can be used and the application of the mobile terminal can be used.

Other objects, features and advantages of the invention will become apparent from the following description of the embodiments of the invention taken in conjunction with the accompanying drawings.

BRIEF DESCRIPTION OF DRAWINGS

FIG. 3 illustrates an example of a table configuration for managing information and programs for controlling cooperating vehicle-mounted device, mobile telephone, and application;

FIG. 4 illustrates an example of a table configuration converted so as to use input information of the vehicle-mounted device by the mobile telephone;

DESCRIPTION OF EMBODIMENTS

Hereinafter, embodiments of the present invention will be described with reference to the accompanying drawings.

Figure 1:
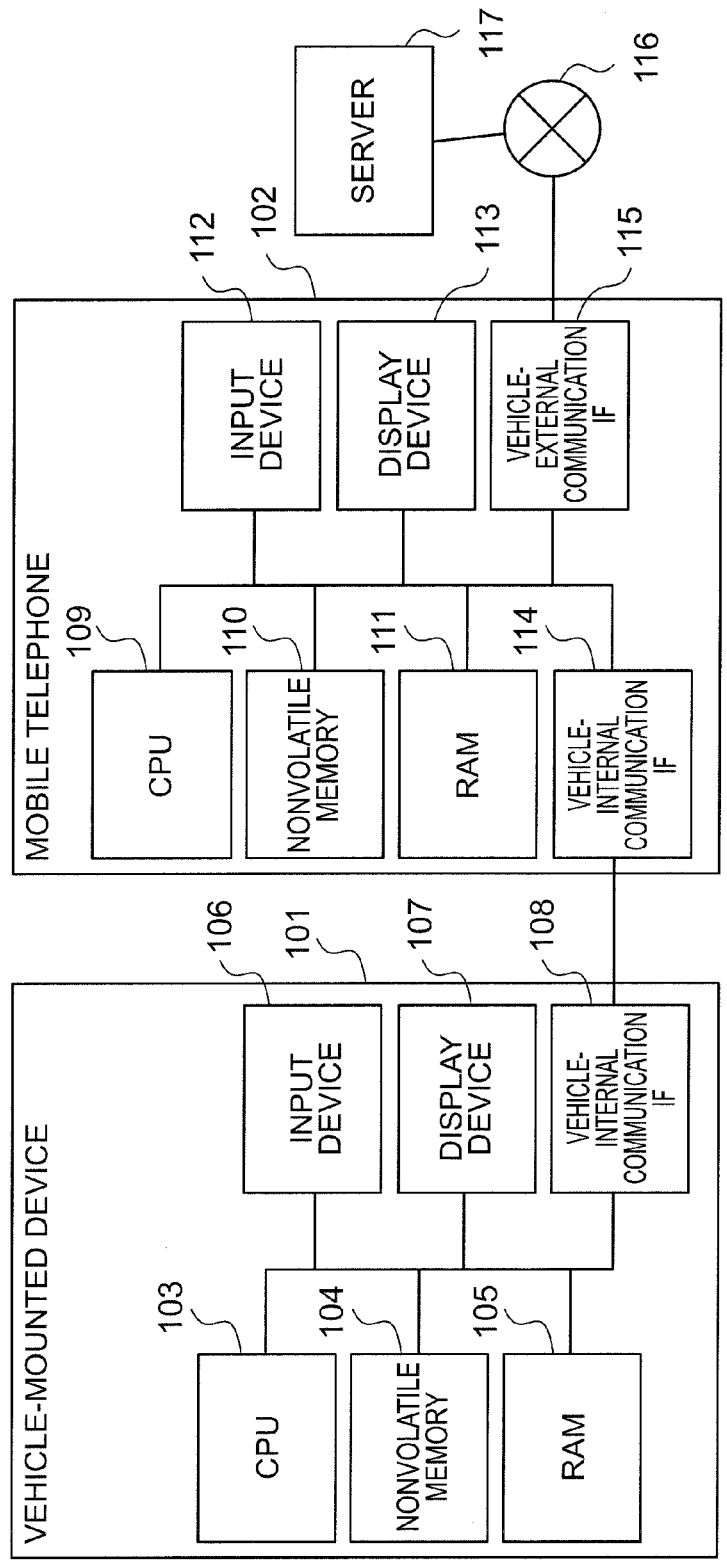
FIG. 1 is a diagram exemplifying a hardware configuration of a remote control system by a vehicle-mounted device according to an embodiment.

FIG. 1 is a hardware configuration diagram of a remote control system by a vehicle-mounted device according to a first embodiment. The remote control system by the vehicle-mounted device is configured by including the vehicle-mounted device, a mobile telephone, a network, and a server. In this figure, a reference numeral 101 denotes the vehicle-mounted device, 102 denotes the mobile telephone, 103 denotes a CPU, 104 denotes a nonvolatile memory, 105 denotes a RAM, 106 denotes an input device, 107 denotes a display device, 108 denotes a vehicle-internal communication IF, 109 denotes a CPU, 110 denotes a nonvolatile memory, 111 denotes a RAM, 112 denotes an input device, 113 denotes a display device, 114 denotes a vehicle-internal communication IF, 115 denotes a vehicle-external communication IF, 116 denotes the network, and 117 denotes the server.

The vehicle-mounted device 101 is configured by including the CPU 103, the nonvolatile memory 104, the RAM 105, the input device 106, the display device 107, and the vehicle-internal communication IF 108.

The CPU 103 executes programs stored in the nonvolatile memory 104 while using the RAM 105 as a task memory. The nonvolatile memory 104 stores programs of the vehicle-mounted device executed by the CPU 103. The input device 106 is an input device such as a key, a dial, and a touch panel. The display device 107 is a display device such as a liquid crystal display that displays a program execution result by the CPU 103. The vehicle-internal communication IF 108 is a wired or wireless communication interface, and can be connected to the mobile telephone or a personal computer.

The mobile telephone 102 is configured by including the CPU 109, the nonvolatile memory 110, the RAM 111, the input device 112, the display device 113, the vehicle-internal communication IF 114, and the vehicle-external communication IF 115.

The CPU 109 executes programs stored in the nonvolatile memory 110 while using the RAM 111 as a task memory. The nonvolatile memory 110 stores programs of the mobile telephone executed by the CPU 109. The input device 112 is an input device such as a key and a touch panel. The display device 113 is a display device such as a liquid crystal display that displays a program execution result by the CPU 109. The vehicle-internal communication IF 114 is a wired or wireless communication interface, and can be connected to the vehicle-mounted device or a personal computer. The vehicle-external communication IF 115 is a communication interface capable of connecting the mobile telephone 102 to the server 117 through the network 116.

The vehicle-mounted device 101 remotely controls the mobile telephone 102 through the vehicle-internal communication IF 108. The mobile telephone 102 executes an application program in accordance with operations of the vehicle-mounted device 101 through the vehicle-internal communication IF 114, and displays results thereof on the display device 107 of the vehicle-mounted device 101.

Further, the mobile telephone 102 is connected to the server 117 through the network 116. The mobile telephone 102 transmits to the server 117 vehicle-mounted device identification data (hereinafter, identification data is referred to as ID) received from the vehicle-mounted device 101, mobile telephone ID, and ID and a version of an application program to be executed. Further, the mobile telephone 102 downloads from the server 117 a setting file and a control program of the vehicle-mounted device 101 and those of the mobile telephone 102 to be required to remotely control an application program of the mobile telephone 102 by the vehicle-mounted device 101, installs them, and executes the application program.

Thereby, a remote control of the application program of the mobile telephone 102 is realized by the vehicle-mounted device 101.

Figure 2:
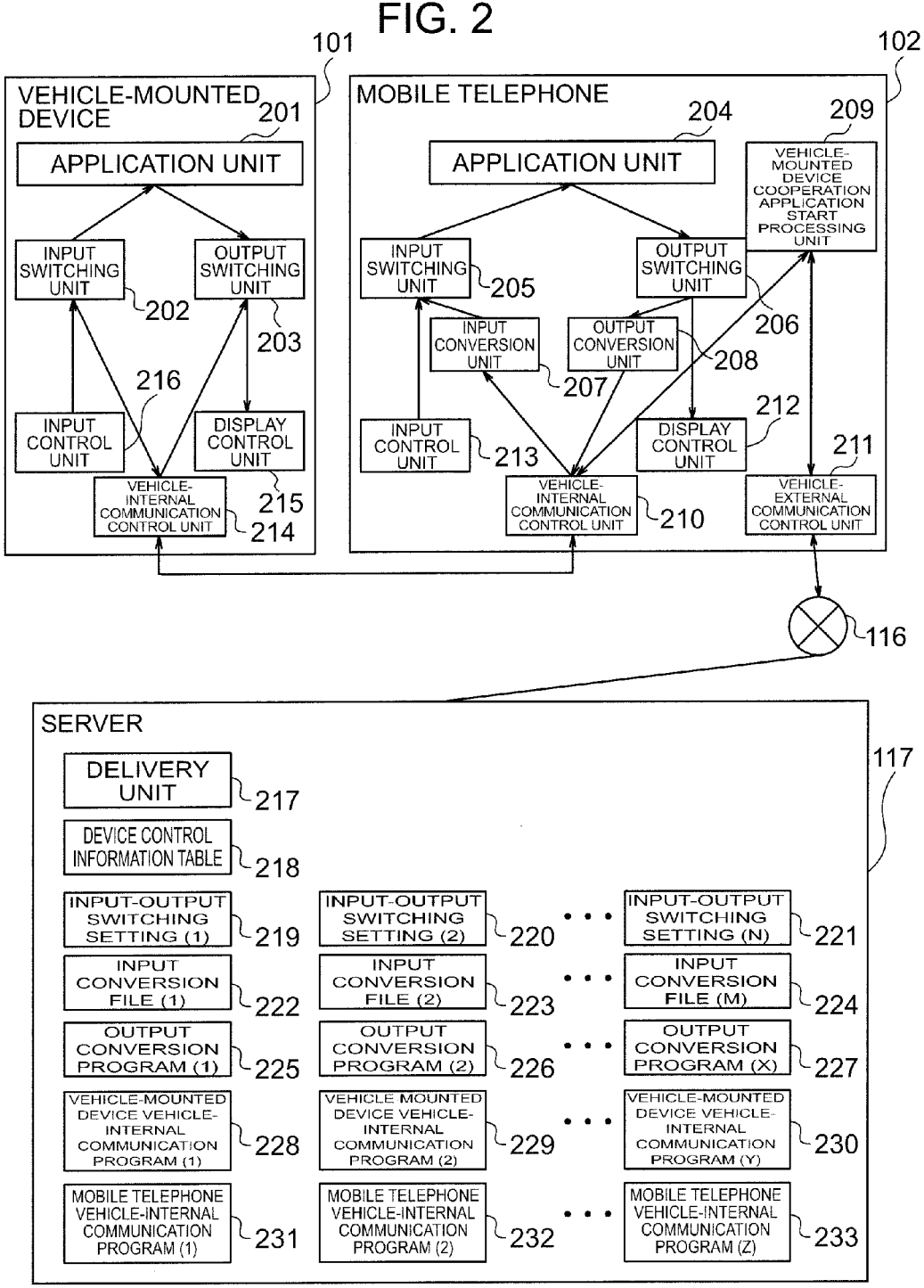
FIG. 2 is a diagram exemplifying a software configuration of the remote control system by the vehicle-mounted device according to the embodiment.

FIG. 2 is a software configuration diagram of the remote control system by the vehicle-mounted device according to the first embodiment.

In the drawing, in the remote control system by the vehicle-mounted device of FIG. 1, about a portion having the same function as that of the configuration to which the same reference numeral as that previously illustrated in FIG. 1 is given, descriptions will be omitted.

In the vehicle-mounted device 101, a reference numeral 201 denotes an application unit, 202 denotes an input switching unit, 203 denotes an output switching unit, 214 denotes a vehicle-internal communication control unit, 215 denotes a display control unit, and 216 denotes an input control unit. When the CPU 103 executes programs stored in the nonvolatile memory 104 while using the RAM 105 as a task memory, these processing units are realized.

The vehicle-mounted device 101 of the present embodiment differs from a conventional vehicle-mounted device in that the vehicle-mounted device 101 includes the input switching unit 202, the output switching unit 203, and the program rewritable vehicle-internal communication control unit 214.

In the mobile telephone 102, a reference numeral 204 denotes an application unit, 205 denotes an input switching unit, 206 denotes an output switching unit, 207 denotes an input conversion unit, 208 denotes an output conversion unit, 209 denotes a vehicle-mounted device cooperation application start processing unit, 210 denotes a vehicle-internal communication control unit, 211 denotes a vehicle-external communication control unit, 212 denotes a display control unit, and 213 denotes an input control unit. When the CPU 109 executes programs stored in the nonvolatile memory 110 while using the RAM 111 as a task memory, these processing units are realized.

The mobile telephone 102 of the present embodiment differs from a conventional vehicle-mounted device in that the mobile telephone 102 includes the vehicle-mounted device cooperation application start processing unit 209, the input switching unit 205, the output switching unit 206, the input conversion unit 207, the output conversion unit 208, and the program rewritable vehicle-internal communication control unit 210.

In the server 117, a reference numeral 217 denotes a delivery unit, 218 denotes a device control information table, 219 denotes an input-output switching setting file (1), 220 denotes an input-output switching setting file (2), 221 denotes an input-output switching setting file (N), 222 denotes an input conversion table (1), 223 denotes an input conversion table (2), 224 denotes an input conversion table (M), 225 denotes an output conversion program (1), 226 denotes an output conversion program (2), 227 denotes an output conversion program (X), 228 denotes a vehicle-mounted device vehicle-internal communication program (1), 229 denotes a vehicle-mounted device vehicle-internal communication program (2), 230 denotes a vehicle-mounted device vehicle-internal communication program (Y), 231 denotes a mobile telephone vehicle-internal communication program (1), 232 denotes a mobile telephone vehicle-internal communication program (2), and 233 denotes a mobile telephone vehicle-internal communication program (Z). When a CPU not illustrated in FIG. 1 executes programs stored in a storage device not illustrated in a similar fashion, the delivery unit 217 is realized.

The device control information table 218 is a table exemplified in FIG. 3, and has a configuration in which in accordance with ID 301 of the vehicle-mounted device 101, ID 302 of the mobile telephone 102, and ID 303 of application executed by the application unit 204 of the mobile telephone 102, the setting information or programs for realizing them of the input switching unit 202 and the output switching unit 203 of the vehicle-mounted device 101 and those of the input switching unit 205 and the output switching unit 206 of the mobile telephone 102 can be selected from N pieces of input switching setting (the input switching setting (1) 219, the input switching setting (2) 220, and the input switching setting (N)).

Similarly, an input conversion method of the input conversion unit 207 of the mobile telephone 102 and an output conversion method of the output conversion unit 208 of the mobile telephone 102 can be selected from the communication program of the vehicle-internal communication control unit 204 of the vehicle-mounted device 101 and the communication program of the vehicle-internal communication control unit 210 of the mobile telephone 102.

The input conversion method of the input conversion unit 207 of the mobile telephone 102 can be selected from M pieces of input conversion tables (the input conversion table (1) 222, the input conversion table (2) 223, and the input conversion table (M) 224) held by the server 117.

The output conversion method of the output conversion unit 208 of the mobile telephone 102 can be selected from X pieces of output conversion programs (the output conversion program (1) 225, the output conversion program (2) 226, and the output conversion program (X) 227) held by the server 117.

The communication program of the vehicle-internal communication control unit 204 of the vehicle-mounted device 101 can be selected from Y pieces of vehicle-mounted device vehicle-internal communication programs (the vehicle-mounted device vehicle-internal communication program (1) 228, the vehicle-mounted device vehicle-internal communication program (2) 229, and the vehicle-mounted device vehicle-internal communication program (Y) 230) held by the server 117.

The communication program of the vehicle-internal communication control unit 210 of the mobile telephone 102 can be selected from setting of Z pieces of mobile telephone vehicle-internal communication programs (the mobile telephone vehicle-internal communication program (1) 231, the mobile telephone vehicle-internal communication program (2) 232, and the mobile telephone vehicle-internal communication program (Z) 233) held by the server 117.

The application unit 201 of the vehicle-mounted device 101 receives input information from the input switching unit 202, and outputs a display via the output switching unit 203. The input switching unit 202 selects whether to send the information received from the input control unit 216 to the mobile telephone 102 via the vehicle-internal communication control unit 214 or the application unit 201. The output switching unit 203 switches whether to display the application unit 201 or the mobile telephone 102 received via the vehicle-internal communication control unit 214. The display control unit 215 controls the data received from the output switching unit 203 to be displayed on the display device 107. The input control unit 216 controls input data received from the input device 106, information received from a sensor (not illustrated) connected to the vehicle-mounted vehicle 101 and that received from the vehicle in which it is installed, or information such as a map held by the vehicle-mounted device 101 to be sent to the input switching unit 202.

The vehicle-internal communication control unit 214 sends the input data received from the mobile telephone 102 to the input switching unit 202, and sends the display data received from the output switching unit 203 to the mobile telephone 102.

The application unit 204 of the mobile telephone 102 receives input information from the input switching unit 205, and outputs a display via the output switching unit 206.

In accordance with the setting of the input-output switching setting file, the input switching unit 205 selects, on the basis of the types of information, the information received from the input control unit 213 or the information received from the input conversion unit 207, and sends it to the application unit 204. The output switching unit 206 selects whether an output from the application unit 204 is sent to any of the output conversion unit 208 and the display control unit 212. The input conversion unit 207 converts the input information received from the vehicle-internal communication control unit 210 into a format according to specifications of the application unit 204 of the mobile telephone 102, and sends it to the input switching unit 205. The output conversion unit 208 converts the output received from the output switching unit 206 into a format according to specifications of the display on the vehicle-mounted device 101, and sends it to the vehicle-internal communication control unit 210.

The vehicle-mounted device cooperation application start processing unit 209 of the mobile telephone 102 is connected to the vehicle-external communication control unit 211 through the vehicle-internal communication IF 114, and acquires a conversion table and a control program from the server 117 via the vehicle-external communication control unit 211. Further, the vehicle-mounted device cooperation application start processing unit 209 acquires the ID of the vehicle-mounted device 101 and sends various types of programs to the vehicle-mounted device 101 through the vehicle-internal communication IF 114.

The vehicle-internal communication control unit 210 is connected to the vehicle-internal communication control unit 214 of the vehicle-mounted device 101, and communicates with the vehicle-mounted device 101. Further, the vehicle-internal communication control unit 210 sends the input information received from the vehicle-mounted device 101 to the input conversion unit 207, and sends the display data received via the output conversion unit 208 to the vehicle-mounted device 101. The display control unit 212 controls the data received from the output switching unit 206 to be displayed on the display device 113. The input control unit 213 controls the data received from the input device 112 to be sent to the input switching unit 205. The vehicle-internal communication control unit 214 controls communication with the vehicle-mounted device 101 through the vehicle-internal communication IF 114.

In accordance with the instruction of the vehicle-mounted device cooperation application start processing unit 209, the vehicle-external communication control unit 211 communicates with the server 117 through the network 116.

The delivery unit 217 of the server 117 refers to the device control information table 218 by the vehicle-mounted device ID, the mobile telephone ID, the application ID, and the version received from the mobile telephone 102. The delivery unit 217 specifies the input switching setting file, the input conversion table, the output conversion program, the vehicle-mounted device vehicle-internal communication program, and the mobile telephone vehicle-internal communication program, suitable for the remote control of the application program of the mobile telephone 102 by the vehicle-mounted device 101, and sends them to the mobile telephone 102.

The input-output switching setting file (1) 219, the input-output switching setting file (2) 220, and the input-output switching setting file (N) 221 are programs for realizing the input switching unit 202, the output switching unit 203, the input switching unit 205, and the output switching unit 206, or are setting values to them.

The input conversion table (1) 222, the input conversion table (2) 223, and the input conversion table (M) 224 are programs for realizing the input conversion unit 207 and data to be referenced at the time of converting the input data of the input conversion unit 207 the vehicle-mounted device 101 into a format suitable for the mobile telephone 102, and are the input conversion table exemplified in FIG. 4, for example.

The output conversion program (1) 225, the output conversion program (2) 226, and the output conversion program (X) 227 are programs for realizing the output conversion unit 208, and convert a display of the mobile telephone 102 into a format suitable for the remote control by the vehicle-mounted device 101.

The vehicle-mounted device vehicle-internal communication program (1) 228, the vehicle-mounted device vehicle-internal communication program (2) 229, and the vehicle-mounted device vehicle-internal communication program (Y) 230 are programs to be executed by the vehicle-internal communication control unit 214, and are communication control programs of a communication system suitable for the remote control of the mobile telephone 102 by the vehicle-mounted device 101.

The mobile telephone vehicle-internal communication program (1) 231, the mobile telephone vehicle-internal communication program (2) 232, and the mobile telephone vehicle-internal communication program (Z) 233 are programs to be executed by the vehicle-internal communication control unit 210, and are the communication control programs of the communication system suitable for the remote control of the mobile telephone 102 by the vehicle-mounted device 101.

FIG. 3 is a view illustrating the device control information table. This is a table for managing information and programs for controlling the cooperating vehicle-mounted device, mobile telephone, and application unit.

The "vehicle-mounted device ID" 301 is the ID peculiar to the type of the vehicle-mounted device. In the "mobile telephone ID" 302, the ID peculiar to the type of the mobile telephone is described. In the "application ID" 303, the ID peculiar to the application unit to be started up is described. In the version 304, the version of the application unit to be started up is described.

In the row 310, descriptions in the case where the "vehicle-mounted device ID" is "123", the "mobile telephone ID" is "233", the "application ID" is "1", and the "version" is "1" are given. In the row 311, descriptions in the case where the "vehicle-mounted device ID" is "123", the "mobile telephone ID" is "233", the "application ID" is "2", and the "version" is "2" are given.

In the "input-output switching setting file ID" 305, the ID of the input-output switching setting file to be selected is described in the case where the vehicle-mounted device and the mobile telephone cooperate with each other and the application unit is started up. In the case where the "vehicle-mounted device ID" is "123", the "mobile telephone ID" is "233", the "application ID" is "1", and the "version" is "1", for example, the "input-output switching setting file ID" is "1". In this case, the delivery unit 217 sends the input-output switching setting file (1) 219 to the mobile telephone 102. In the case where the "vehicle-mounted device ID" is "123", the "mobile telephone ID" is "233", the "application ID" is "2", and the "version" is "2", the input-output switching setting file ID is "2". In this case, the delivery unit 217 sends the input-output switching setting files (2) 220 to the mobile telephone 102.

In the "input conversion table ID" 306, the ID of the input conversion table to be selected is described. In the case where the "vehicle-mounted device ID" is "123", the "mobile telephone ID" is "233", the "application ID" is "1", and the "version" is "1", for example, the "input conversion table ID" is "1". In this case, the delivery unit 217 sends the input conversion table (1) 222 to the mobile telephone 102. In the case where the "vehicle-mounted device ID" is "123", the "mobile telephone ID" is "233", the "application ID" is "2", and the "version" is "2", the "input conversion table ID" is "1". In this case, the delivery unit 217 sends the input conversion table (1) 222 to the mobile telephone 102.

In the "output conversion program ID" 307, the ID of the output conversion program to be selected is described. In the case where the "vehicle-mounted device ID" is "123", the "mobile telephone ID" is "233", the "application ID" is "1", and the "version" is "1", for example, the "output conversion program ID" is "1". In this case, the delivery unit 217 sends the output conversion program (1) 225 to the mobile telephone 102. In the case where the "vehicle-mounted device ID" is "123", the "mobile telephone ID" is "233", the "application ID" is "2", and the "version" is "2", the "output conversion program ID" is "1". In this case, the delivery unit 217 sends the output conversion program (1) 225 to the mobile telephone 102.

In the "vehicle-mounted device vehicle-internal communication program ID" 308, the ID of the vehicle-internal communication program of the vehicle-mounted device to be selected is described. In the case where the "vehicle-mounted device ID" is "123", the "mobile telephone ID" is "233", the "application ID" is "1", and the "version" is "1", for example, the "vehicle-mounted device vehicle-internal communication program ID" is "1". In this case, the delivery unit 217 sends the vehicle-mounted device vehicle-internal communication program (1) 228 to the mobile telephone 102. In the case where the "vehicle-mounted device ID" is "123", the "mobile telephone ID" is "233", the "application ID" is "2", and the "version" is "2", the "vehicle-mounted device vehicle-internal communication program ID" is "1". In this case, the delivery unit 217 sends the vehicle-mounted device vehicle-internal communication program (2) 229 to the mobile telephone 102.

In the "mobile telephone vehicle-internal communication program ID" 309, the ID of the vehicle-internal communication program of the mobile telephone to be selected is described. In the case where the "vehicle-mounted device ID" is "123", the "mobile telephone ID" is "233", the "application ID" is "1", and the "version" is "1", the "mobile telephone vehicle-internal communication program ID" is "1". In this case, the delivery unit 217 sends the mobile telephone vehicle-internal communication program (1) 231 to the mobile telephone 102. In the case where the "vehicle-mounted device ID" is "123", the "mobile telephone ID" is "233", the "application ID" is "2", and the "version" is "2", the "mobile telephone vehicle-internal communication program ID" is "1". In this case, the delivery unit 217 sends the mobile telephone vehicle-internal communication program (1) 231 to the mobile telephone 102.

The input information from the vehicle-mounted device 101 is roughly classified into a control code to be converted into the application unit 204, such as a display control code, a key code, and a touch panel operation (gesture) code; data to be converted into the application unit 204, such as display data (for example, data to convert resolution or an arrangement and a size of an icon), touch panel coordinates (for example, data to be converted according to resolution), geographic location information such as a GPS, map coordinate data, a temperature (data to convert unit such as Celsius or Fahrenheit, for example, an outside air temperature, a room temperature, and an air conditioner preset temperature), and vehicle speed data (for example, data to convert pulse data into numerical data); and data that is not necessarily converted, such as text data, numerical data to be input by a user, audio data, and VICS received data.

In accordance with the setting of the input-output switching setting file (2) 220, the input switching unit 205 selects any of the information that can be acquired by the mobile telephone inside and the information that is acquired from the vehicle-mounted device and processed by the input conversion unit, and inputs it to the application unit 204. In accordance with the setting of the input-output switching setting file (2) 220, the input conversion unit 207 converts the vehicle-mounted device information selected by the input switching unit 205 into a format according to specifications of the application unit 204, if necessary, and inputs it to the input switching unit 205.

FIG. 4 is a view illustrating an input conversion table to be referenced by the input conversion unit 207. This is a table for conversion so as to use the input information of the vehicle-mounted device by the mobile telephone.

The "input code" 401 is an input code from the input device 106 of the vehicle-mounted device 101 such as a key, a dial, a touch panel, and a sensor. In the row 404, descriptions in the case where the "input code" is "key (1)" are given. In the row 405, descriptions in the case where the "input code" is "key (2)" are given. In the row 406, descriptions in the case where the "input code" is "dial (1) UP" are given. In the row 407, descriptions in the case where the "input code" is "dial (1) DOWN" are given. In the row 408, descriptions in the case where the "input code" is "sensor code (1)" are given. In the row 409, descriptions in the case where the "input code" is "sensor code (2)" are given. In the row 410, descriptions in the case where the "input code" is "map data code (1)" are given. In the row 411, descriptions in the case where the "input code" is "map data code (2)" are given.

In the "control code" 402, the control code available for the application program of the mobile telephone corresponding to the input code 401 is given. For example, the "control code" is "STOP" in the case where the "input code" is the "key (1)", the "control code" is "START" in the case where the "input code" is the "key (2)", the "control code" is "enlargemet" in the case where the "input code" is the "dial (1) UP", the "control code" is "contraction" in the case where the "input code" is the "dial (1) DOWN", the "control code" is "mobile telephone GPS code (1)" in the case where the "input code" is the "sensor code (1)", the "control code" is "mobile telephone GPS code (2)" in the case where the "input code" is the "sensor code (2)", the "control code" is "mobile telephone map data code (1)" in the case where the "input code" is the "map data code (1)", and the "control code" is "mobile telephone map data code (2)" in the case where the "input code" is the "map data code (2)".

In the "icon" 403, an icon representing the control used in the application program of the mobile telephone is given. For example, the "icon" is "STOP" in the case where the "input code" is the "key (1)", the "icon" is "→" in the case where the "input code" is the "key (2)", the "icon" is "←→" in the case where the "input code" is the "dial (1) UP", the "icon" is "→←" in the case where the "input code" is the "dial (1) DOWN", the "icon" is "nothing" in the case where the "input code" is the "sensor code (1)", the "icon" is "nothing" in the case where the "input code" is the "sensor code (2)", the "icon" is "nothing" in the case where the "input code" is the "map data code (1)", and the "icon" is "nothing" in the case where the "input code" is the "map data code (2)".

In this manner, as the input information to be input to the input switching unit 204 via the input conversion unit 207, a sensor and a code of the map data can be used in addition to the information corresponding to the operation of the user. Thereby, from the information acquired by the mobile telephone and the vehicle-mounted device, information having higher accuracy can be selected and used.

Figure 5:
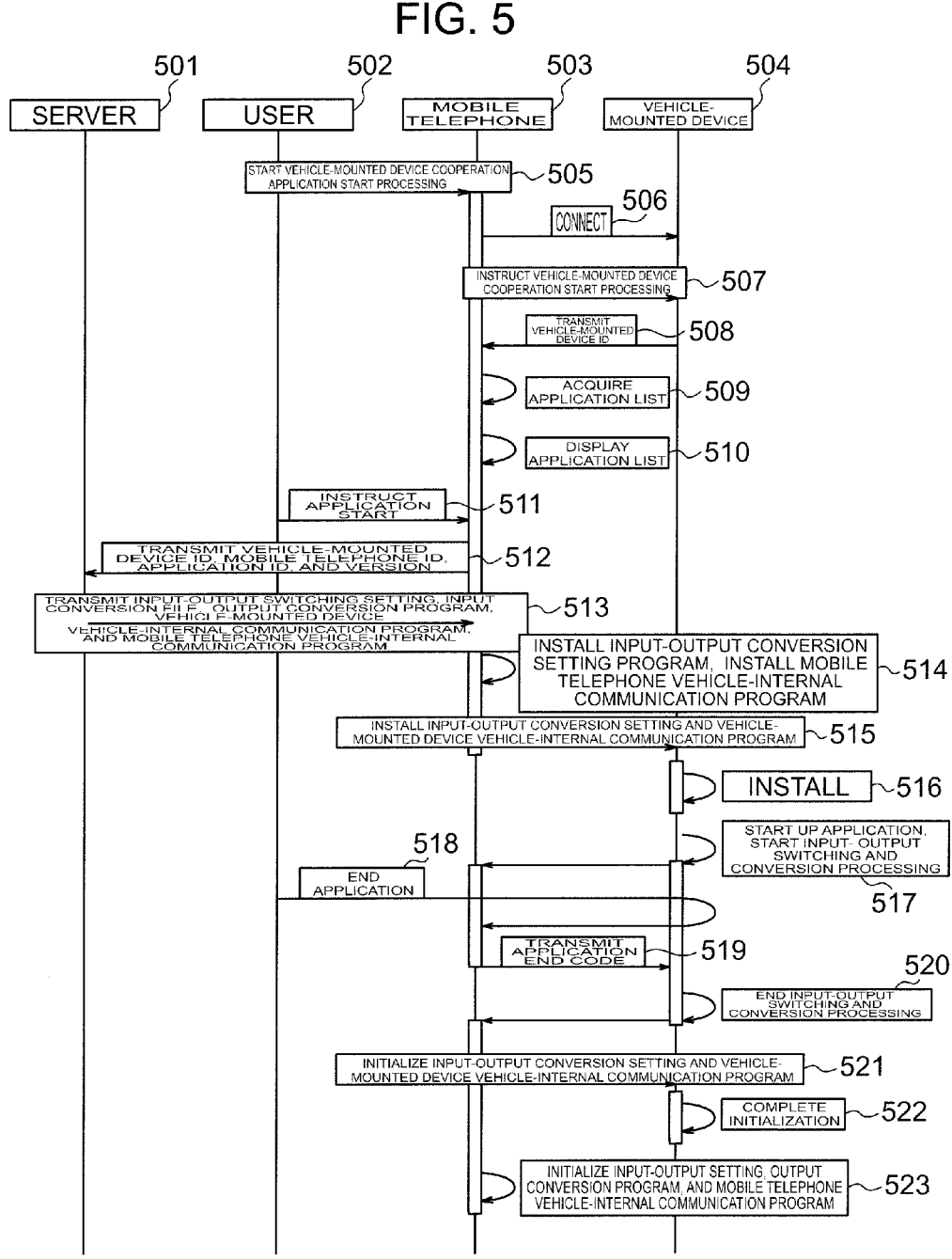
FIG. 5 illustrates an example of a sequence started up so as to remotely control an application of the mobile telephone by the vehicle-mounted device.

FIG. 5 is a view illustrating a start sequence of the application unit of the mobile telephone. This is a sequence to be started up so that the application unit of the mobile telephone is remotely controlled by the vehicle-mounted device.

Here, a reference numeral 501 denotes the server, 502 denotes the user, 503 denotes the mobile telephone, and 504 denotes the vehicle-mounted device.

First, the user 502 performs the operation of a vehicle-mounted device cooperation application start processing start 505 to the mobile telephone 503. Then, the mobile telephone 503 connects 506 with the vehicle-mounted device 504.

Then, the mobile telephone 503 transmits a vehicle-mounted device cooperation start processing instruction 507 to the vehicle-mounted device 504. Then, the vehicle-mounted device 504 transmits the vehicle-mounted device ID 508 to the mobile telephone 503.

Then, the mobile telephone 503 performs a process 509 for acquiring an application list.

Then, the mobile telephone 503 performs a process 510 for displaying the application list.

Then, the user 502 performs to the mobile telephone 503 an application start instruction 511 about the application program desired to be remotely controlled from the vehicle-mounted device in accordance with the displayed application list.

Then, the mobile telephone 503 transmits (512) to the server 501 the vehicle-mounted device ID, the mobile telephone ID, the application ID, and the version.

Then, the server 501 transmits (513) to the mobile telephone 503 the input-output switching setting file, the input conversion table, the output conversion program, the vehicle-mounted device vehicle-internal communication program, and the mobile telephone vehicle-internal communication program corresponding to the vehicle-mounted device ID, the mobile telephone ID, the application ID, and the version.

Then, the mobile telephone 503 installs the input-output switching setting file, the output conversion program, and the mobile telephone vehicle-internal communication program, and performs a process 514 for setting the input switching unit 205, the output switching unit 206, the input conversion unit 207, the output conversion unit 208, and the vehicle-internal communication control unit 210.

Then, the mobile telephone 503 transmits (515) the input-output conversion setting, the vehicle-mounted device vehicle-internal communication program, and installation instructions thereof to the vehicle-mounted device 504, and the vehicle-mounted device 504 performs (516) installation and setting of the input switching unit 202, the output switching unit 203, and the vehicle-internal communication control unit 214.

Then, after the completion of the installation process 516, the vehicle-mounted device 504 performs a process 517 for starting up an application, starts up the application of the mobile telephone 503, and starts an input-output switching process and a conversion process of the mobile telephone 503 and the vehicle-mounted device 504.

The appropriate input switching setting file, input conversion table, output conversion program, vehicle-mounted device vehicle-internal communication program, and mobile telephone vehicle-internal communication program are received from the server 501, set in the mobile telephone 503 and the vehicle-mounted device 504, and then the application of the mobile telephone 503 is started up. Accordingly, in the vehicle-mounted device 504, a window of the application program of the mobile telephone 503 is displayed on the display device of the vehicle-mounted device 504, and the operations of the user to the vehicle-mounted device 504 are transferred to the application programs of the mobile telephone 503.

Since the latest setting can be received from the server 501, even if the new mobile telephone 503 and the old vehicle-mounted device 504 are combined, the application program of the mobile telephone 503 can be remotely controlled by the vehicle-mounted device 504.

The user 502 ends the usage of the application program, and then performs the operation of the application end 518 to the application of the mobile telephone 503 via the vehicle-mounted device 504.

Then, the mobile telephone 503 ends the application program, and transmits an application end code 519 to the vehicle-mounted device 504.

Then, the vehicle-mounted device 504 performs a process 520 for ending the input-output switching and the conversion.

Then, the mobile telephone 503 transmits the input-output conversion setting and vehicle-mounted device vehicle-internal communication program initialization 521 to the vehicle-mounted device 504.

Then, the vehicle-mounted device 504 performs a process 522 for completing the initialization.

Finally, the mobile telephone 503 performs a process 523 for initializing the input-output setting, the output conversion program, and the mobile telephone vehicle-internal communication program.

FIG. 5 illustrates an example where the mobile telephone 503 performs the process 514 (process for installing the input-output switching setting file, the output conversion program, and the mobile telephone vehicle-internal communication program, and setting the input switching unit 205, the output switching unit 206, the input conversion unit 207, the output conversion unit 208, and the vehicle-internal communication control unit 210) through the above-described process 512 (process for transmitting the vehicle-mounted device ID, the mobile telephone ID, the application ID, and the version to the server 501) by the mobile telephone 503, and the above-described process 513 (process for transmitting to the mobile telephone 503 the input-output switching setting file, the input conversion table, the output conversion program, the vehicle-mounted device vehicle-internal communication program, and the mobile telephone vehicle-internal communication program corresponding to the vehicle-mounted device ID, the mobile telephone ID, the application ID, and the version) by the server 501; further, the remote control system may have a configuration in which the processes 512 and 513 are not performed.

In this case, the remote control system may have a configuration in which the same function as that of the delivery unit 217 of the server 117, of specifying the input switching setting file, the input conversion table, the output conversion program, the vehicle-mounted device vehicle-internal communication program, and the mobile telephone vehicle-internal communication program, suitable for the remote control of the application program of the mobile telephone 102 by the vehicle-mounted device 101 is previously provided on the vehicle-mounted device cooperation application start processing unit 209 of the mobile telephone 102 from among the device control information table 218, an input-output switching setting group (219 to 221), an input conversion file group (222 to 224), an output conversion file group (225 to 227), a vehicle-mounted device vehicle-internal communication program group (228 to 230), and a mobile telephone vehicle-internal communication program group (231 to 233) with reference to the device control information table 218 by the vehicle-mounted device ID, the mobile telephone ID, the application ID, and the version.

By using this function, the vehicle-mounted device cooperation application start processing unit 209 specifies the input switching setting file, the input conversion table, the output conversion program, the vehicle-mounted device vehicle-internal communication program, and the mobile telephone vehicle-internal communication program, suitable for the remote control of the application program of the mobile telephone 102 by the vehicle-mounted device 101 with reference to the device control information table 218 by the vehicle-mounted device ID, the mobile telephone ID, the application ID, and the version. Further, by using the specified results, the mobile telephone 503 performs a process 514 for installing the input-output switching setting file, the output conversion program, and the mobile telephone vehicle-internal communication program, and setting the input switching unit 205, the output switching unit 206, the input conversion unit 207, the output conversion unit 208, and the vehicle-internal communication control unit 210.

Further, when the input switching setting file, the input conversion table, the output conversion program, the vehicle-mounted device vehicle-internal communication program, and the mobile telephone vehicle-internal communication program suitable for the vehicle-mounted device ID, the mobile telephone ID, the application ID, and the version are not registered in the device control information table 218 of the vehicle-mounted device cooperation application start processing unit 209 of the mobile telephone 102, the mobile telephone 503 may perform the process 512 and the server 501 may perform the process 513. Further, the mobile telephone 503 may add the information (setting, files, and programs) received through the process 513 to various types of data (the device control information table 218, the input-output switching setting group (219 to 221), the input conversion file group (222 to 224), the output conversion file group (225 to 227), the vehicle-mounted device vehicle-internal communication program group (228 to 230), and the mobile telephone vehicle-internal communication program group (231 to 233)) held by the vehicle-mounted device cooperation application start processing unit 209. Thereby, when the mobile telephone 503 and the vehicle-mounted device 504 are then connected to each other, processes on and after the process 514 can be performed without performing the processes 512 and 513.

Further, the device control information table 218, the input-output switching setting group (219 to 221), the input conversion file group (222 to 224), the output conversion file group (225 to 227), the vehicle-mounted device vehicle-internal communication program group (228 to 230), and the mobile telephone vehicle-internal communication program group (231 to 233) are previously held by the application of the mobile telephone 102. When the application is started up by the application start instruction 511, the input switching setting file, the input conversion table, the output conversion program, the vehicle-mounted device vehicle-internal communication program, and the mobile telephone vehicle-internal communication program, which are not included in the device control information table 218 of the vehicle-mounted device cooperation application start processing unit 209, suitable for the vehicle-mounted device ID, the mobile telephone ID, the application ID, and the version may be added to the device control information table 218 of the vehicle-mounted device cooperation application start processing unit 209. Thereby, by executing a new program, a necessary update can be performed without communicating with the server 501.

Figure 6:
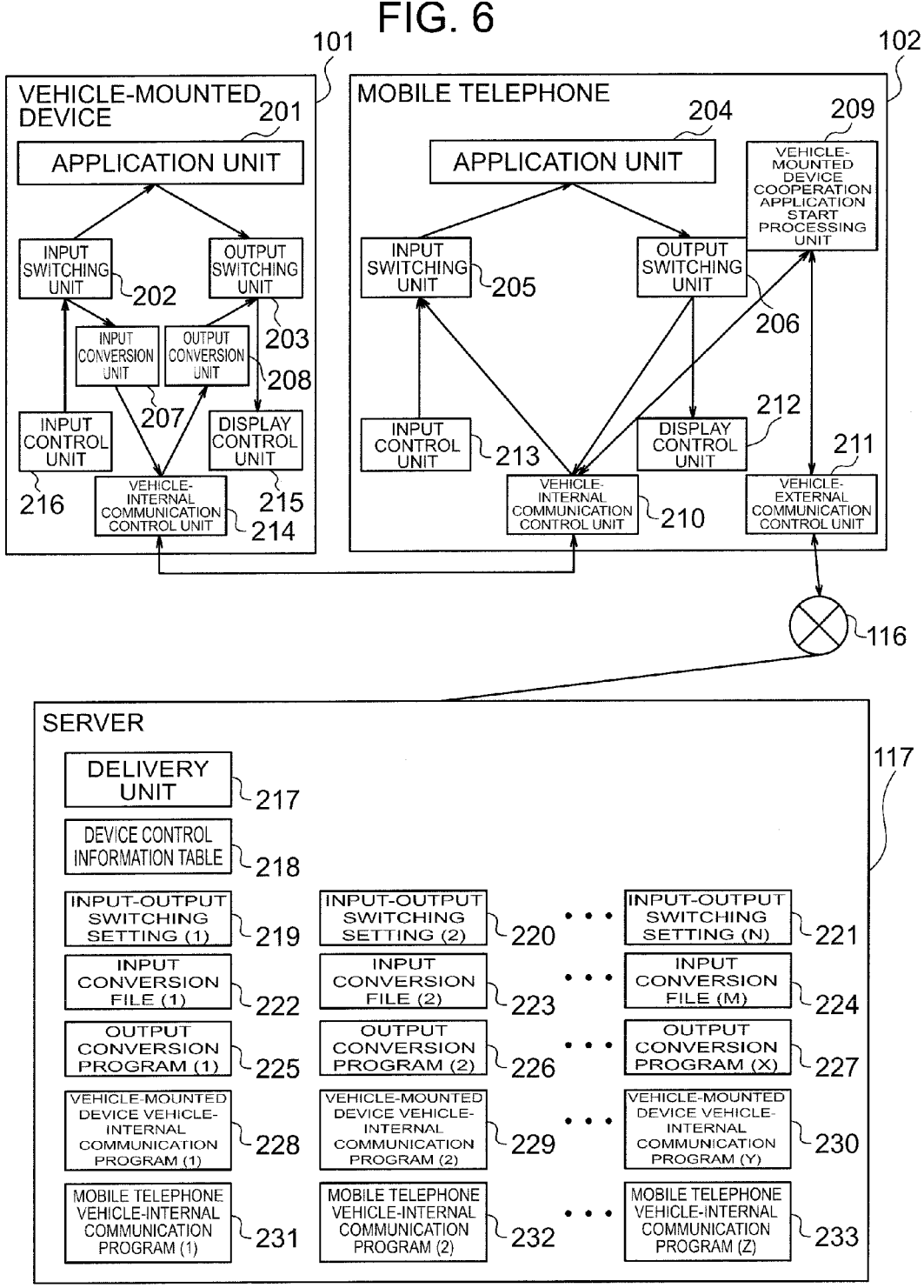
FIG. 6 is a diagram exemplifying the software configuration of the remote control system by the vehicle-mounted device in which a conversion of an input and an output is performed by the vehicle-mounted device.

In FIG. 2, a configuration in which a conversion of an input and an output is performed by the mobile telephone is illustrated; further, a configuration in which a conversion of an input and an output is performed by the vehicle-mounted device may be used as illustrated in FIG. 6. In FIG. 6, about a portion having the same function as that of the configuration to which the same reference numeral as that previously illustrated in FIG. 2 is given, descriptions will be omitted.

Note that, in accordance with the setting of the input-output switching setting file, the input switching unit 205 of the mobile telephone 102 selects, on the basis of the types of information, any of the information that can be acquired by the mobile telephone inside and the information that is acquired and converted by the vehicle-mounted device inside, and inputs it to the application unit 204.

In accordance with the setting of the input-output switching setting file, the input conversion unit 207 of the vehicle-mounted device 101 converts the vehicle-mounted device information output from the input switching unit 202 into a format according to the specifications of the application unit 204 of the mobile telephone 102, if necessary, and transmits it to the mobile telephone via the vehicle-internal communication control unit 214. The output conversion unit 208 converts an output from the mobile telephone 102 received from the vehicle-internal communication control unit 214 into a format according to the specifications of the display on the vehicle-mounted device 101, and transmits it to the display control unit 215 via the output switching unit 203.

It should be further understood by those skilled in the art that although the foregoing description has been made on embodiments of the invention, the invention is not limited thereto and various changes and modification may be made without departing from the spirit of the invention and the scope of the appended claims.

REFERENCE SIGNS LIST

- 101 Vehicle-mounted device
- 102 Mobile telephone
- 103 CPU
- 104 Nonvolatile memory
- 105 RAM
- 106 Input device
- 107 Display device
- 108 Vehicle-internal communication IF
- 109 CPU
- 110 Nonvolatile memory
- 111 RAM
- 112 Input device
- 113 Display device
- 114 Vehicle-internal communication IF
- 115 Vehicle-external communication IF
- 116 Network
- 117 Server
- 201 Application unit
- 202 Input switching unit
- 203 Output switching unit
- 204 Application unit
- 205 Input switching unit
- 206 Output switching unit
- 207 Input conversion unit
- 208 Output conversion unit
- 209 Vehicle-mounted device cooperation application start processing unit
- 210 Vehicle-internal communication control unit
- 211 Vehicle-external communication control unit
- 212 Display control unit
- 213 Input control unit
- 214 Vehicle-internal communication control unit
- 215 Display control unit
- 216 Input control unit
- 217 Delivery unit
- 218 Device control information table
- 219 Input-output switching setting file (1)
- 220 Input-output switching setting file (2)
- 221 Input-output switching setting file (N)
- 222 Input conversion table (1)
- 223 Input conversion table (2)
- 224 Input conversion table (M)
- 225 Output conversion program (1)
- 226 Output conversion program (2)
- 227 Output conversion program (X)
- 228 Vehicle-mounted device vehicle-internal communication program (1)
- 229 Vehicle-mounted device vehicle-internal communication program (2)
- 230 Vehicle-mounted device vehicle-internal communication program (Y)
- 231 Mobile telephone vehicle-internal communication program (1)
- 232 Mobile telephone vehicle-internal communication program (2)
- 233 Mobile telephone vehicle-internal communication program (Z)

The invention claimed is:

1. A remote control system comprising:
a vehicle-mounted device which comprises:
a vehicle-mounted device microprocessor,
a vehicle-mounted device input controller receiving input information to be transmitted to an input switch of the vehicle-mounted device that switches a transmission destination of the input information, and
a vehicle-mounted device display controller receiving output information from an output switch of the vehicle-mounted device that switches output information being transmitted to the display controller of the vehicle-mounted device;
a mobile terminal which comprises:
a mobile terminal microprocessor, wherein the mobile terminal microprocessor executes a start up sequence for an application,
a mobile terminal input controller receiving input information to be transmitted to an input switch of the mobile terminal that switches input information being transmitted to the mobile terminal microprocessor, and
a mobile terminal display controller receiving output information from an output switch of the mobile terminal that switches a transmission destination of output information received from the mobile terminal microprocessor;
a vehicle-internal communication channel operably connecting the vehicle-mounted display device and the mobile terminal;
an input converter converting information transmitted from the vehicle-mounted device into a format according to a specification of the mobile terminal microprocessor;
an output converter converting an output of the mobile terminal processor into a format according to a specification of the vehicle-mounted device; and
a server, wherein
when the mobile terminal microprocessor executes the start up sequence for the application, the mobile terminal microprocessor transmits identification information to the server such that the server uses the identification information to specify a setting file and/or a control program suitable for the operable combination of the vehicle-mounted device, the mobile terminal, and the application;

the mobile terminal microprocessor acquires from the server the setting file and/or control program and configures the vehicle-internal communication channel for operable communication between the mobile terminal and the vehicle-mounted device such that the vehicle-mounted device installs the setting file and/or control program;

the setting file and/or control program sets the input switch of the mobile terminal to switch input information being transmitted to the mobile terminal microprocessor between input information received from the input controller of the mobile terminal and input information received from the input converter, sets the output switch of the mobile terminal to switch the transmission destination of output information received from the mobile terminal microprocessor between the display controller of the mobile terminal and the output converter, sets the input switch of the vehicle-mounted device to switch the transmission destination of input information from the input controller of the vehicle-mounted device between the vehicle-mounted device microprocessor and the vehicle-internal communication channel, and sets the output switch of the vehicle-mounted device to switch output information transmitted to the display controller of the vehicle-mounted device between output from the vehicle-mounted device microprocessor and output from the vehicle-internal communication channel.

2. The remote control system according to claim 1, wherein the mobile terminal microprocessor comprises a vehicle-mounted device cooperation application start processing circuitry operably coupled to the vehicle-internal communication channel, and wherein the vehicle-mounted device cooperation application start processing circuitry is configured to communicate with the server.

3. The remote control system according to claim 1, wherein the input converter refers to an input conversion table received from the server and converts an input transmitted from the vehicle-mounted device into a format according to a specification of the application executed by the mobile terminal microprocessor, and the output converter refers to an input conversion table received from the server and converts an output of the mobile terminal microprocessor into a format according to a specification of the vehicle-mounted device.

4. A vehicle-mounted device for use in a remote control system including a vehicle-mounted device, a mobile terminal executing an application, and a server, comprising:

a microprocessor operating on the vehicle-mounted device;

an input controller receiving input information to be transmitted to an input switch of the vehicle-mounted device that determines a transmission destination of the input information;

a display controller receiving output information from an output switch of the vehicle-mounted device that switches output information being transmitted to the display controller of the vehicle-mounted device;

an input converter converting information transmitted from the vehicle-mounted device into a format according to a specification of a mobile terminal microprocessor;

an output converter converting an output of the mobile terminal processor into a format according to a specification of the vehicle-mounted device;

a vehicle-internal communication channel for communication with the mobile terminal, wherein identification data of the vehicle-mounted device is transmitted to the mobile terminal via the vehicle-internal communication channel, and a setting file and/or program is acquired on the basis of the vehicle-mounted device identification data, mobile terminal identification data, and application identification data, wherein when the mobile terminal microprocessor executes the application, a start up sequence causes the mobile terminal microprocessor to transmit identification information to the server such that the server uses the identification information to specify a setting file and/or a control program suitable for the operable combination of the vehicle-mounted device, the mobile terminal, and the application;

the mobile terminal microprocessor acquires from the server the setting file and/or control program and configures the vehicle-internal communication channel for operable communication between the mobile terminal and the vehicle-mounted device such that the vehicle-mounted device installs the setting file and/or control program;

the setting file and/or control program sets the input switch of the mobile terminal to switch input information being transmitted to the mobile terminal microprocessor between input information received from the input controller of the mobile terminal and input information received from the input converter, sets the output switch of the mobile terminal to switch the transmission destination of output information received from the mobile terminal microprocessor between the display controller of the mobile terminal and the output converter, sets the input switch of the vehicle-mounted device to switch the transmission destination of input information from the input controller of the vehicle-mounted device between the vehicle-mounted device microprocessor and the vehicle-internal communication channel, and sets the output switch of the vehicle-mounted device to switch output information transmitted to the display controller of the vehicle-mounted device between output from the vehicle-mounted device microprocessor and output from the vehicle-internal communication channel.

5. A mobile terminal for use in a remote control system including a vehicle-mounted device, the mobile terminal executing an application, and a server, comprising:

a microprocessor operating on the mobile terminal;

an input controller receiving input information to be transmitted to an input switch of the mobile terminal that switches input information being transmitted to the mobile terminal microprocessor;

a display controller receiving output information from an output switch of the mobile terminal that switches transmission destination of output information received from the mobile terminal microprocessor;

an input converter converting information transmitted from the vehicle-mounted device into a format according to a specification of the mobile terminal microprocessor;

an output converter converting an output of the mobile terminal processor into a format according to a specification of the vehicle-mounted device;

a vehicle-internal communication channel for communicating with the vehicle-mounted device, wherein
identification data of the vehicle-mounted device is transmitted to the mobile terminal via the vehicle-internal communication channel, and a setting file and/or program is acquired on the basis of the vehicle-mounted device identification data, mobile terminal identification data, and application identification data, wherein when the mobile terminal microprocessor executes the application, a start up sequence causes the mobile terminal microprocessor to transmit identification information to the server such that the server uses the identification information to specify a setting file and/or a control program suitable for the operable combination of the vehicle-mounted device, the mobile terminal, and the application;

the mobile terminal microprocessor acquires from the server the setting file and/or control program and configures the vehicle-internal communication channel for operable communication between the mobile terminal and the vehicle-mounted device such that the vehicle-mounted device installs the setting file and/or control program;

the setting file and/or control program sets the input switch of the mobile terminal to switch input information being transmitted to the mobile terminal microprocessor between input information received from the input controller of the mobile terminal and input information received from the input converter, sets the output switch of the mobile terminal to switch the transmission destination of output information received from the mobile terminal microprocessor between the display controller of the mobile terminal and the output converter, sets the input switch of the vehicle-mounted device to switch the transmission destination of input information from the input controller of the vehicle-mounted device between a vehicle-mounted device microprocessor and the vehicle-internal communication channel, and sets the output switch of the vehicle-mounted device to switch output information transmitted to the display controller of the vehicle-mounted device between output from the vehicle-mounted device microprocessor and output from the vehicle-internal communication channel.

* * * * *